US012452902B2

(12) United States Patent
Mukkera et al.

(10) Patent No.: US 12,452,902 B2
(45) Date of Patent: Oct. 21, 2025

(54) BUILDING TRANSPORT BLOCKS IN WIRELESS NETWORKS

(71) Applicant: QUALCOMM Incorporated, San Diego, CA (US)

(72) Inventors: Krishna Chaitanya Mukkera, San Diego, CA (US); Shailesh Maheshwari, San Diego, CA (US); Bao Vinh Nguyen, San Diego, CA (US); Dinesh Kumar Devineni, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/192,696

(22) Filed: Mar. 4, 2021

(65) Prior Publication Data

US 2021/0282150 A1 Sep. 9, 2021

Related U.S. Application Data

(60) Provisional application No. 62/986,359, filed on Mar. 6, 2020.

(51) Int. Cl.
*H04W 72/563* (2023.01)
*H04L 5/00* (2006.01)
*H04W 52/18* (2009.01)
*H04W 52/36* (2009.01)
*H04W 72/1268* (2023.01)
*H04W 72/23* (2023.01)

(52) U.S. Cl.
CPC .......... *H04W 72/563* (2023.01); *H04L 5/001* (2013.01); *H04W 52/18* (2013.01); *H04W 52/367* (2013.01); *H04W 72/1268* (2013.01); *H04W 72/23* (2023.01)

(58) Field of Classification Search
CPC ... H04W 72/06; H04W 52/18; H04W 52/367; H04W 72/1268; H04W 72/14; H04W 72/1289; H04W 52/281; H04L 5/001; H04L 5/0044; H04L 5/0094
See application file for complete search history.

(56) References Cited

U.S. PATENT DOCUMENTS

| 2011/0310986 A1* | 12/2011 | Heo | H04W 72/0413 |
| | | | 375/259 |
| 2012/0057547 A1* | 3/2012 | Lohr | H04W 72/04 |
| | | | 370/329 |
| 2013/0215811 A1* | 8/2013 | Takaoka | H04W 52/30 |
| | | | 370/311 |

(Continued)

*Primary Examiner* — Derrick W Ferris
*Assistant Examiner* — M Mostazir Rahman
(74) *Attorney, Agent, or Firm* — Arent Fox, LLP

(57) ABSTRACT

A UE employing carrier aggregation receives an uplink grant from a wireless communication system base station for each of a plurality of Physical Uplink Shared CHannel (PUSCH) component carriers. The UE orders each PUSCH component carrier for transmission based at least in part on the uplink grant. The UE ranks logical channels for uplink transmission; and then builds transport blocks comprising data of higher ranked logical channels on higher ordered component carriers. The UE can then transmit the transport blocks across the component carriers to the base station.

27 Claims, 10 Drawing Sheets

(56) References Cited

U.S. PATENT DOCUMENTS

| | | | |
|---|---|---|---|
| 2020/0163030 A1* | 5/2020 | Feuersaenger | H04W 52/281 |
| 2022/0159589 A1* | 5/2022 | Yu | H04B 17/309 |
| 2022/0346028 A1* | 10/2022 | Cirik | H04W 52/54 |
| 2022/0408372 A1* | 12/2022 | Feuersaenger | H04W 52/146 |

* cited by examiner

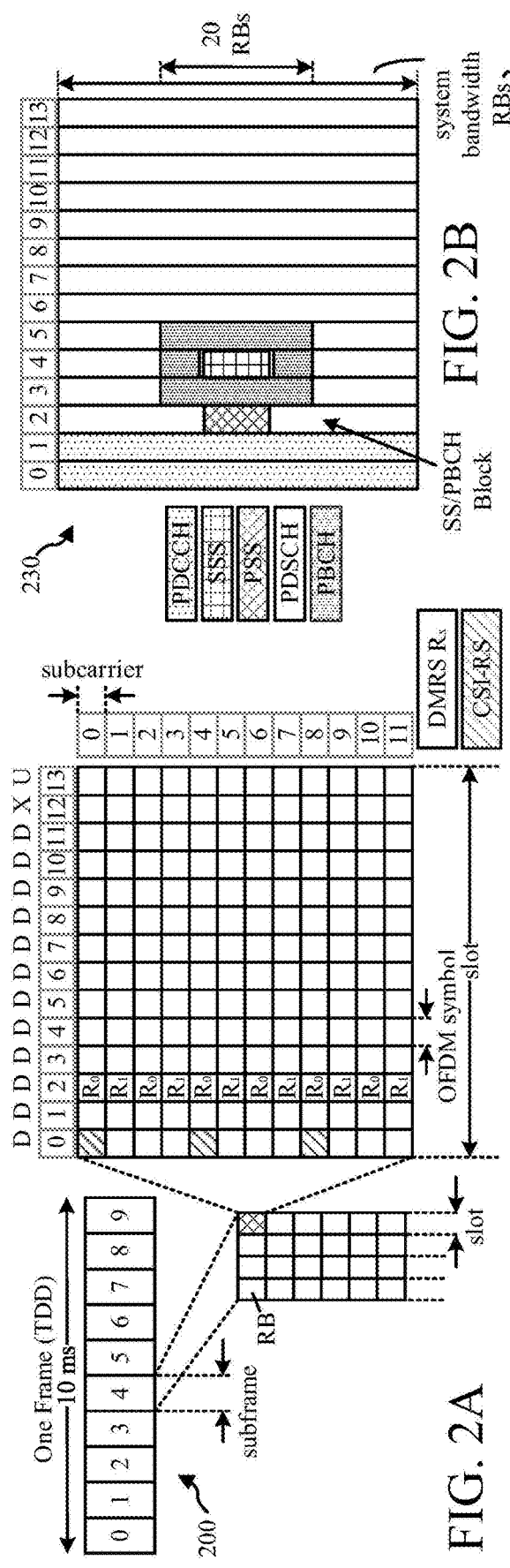
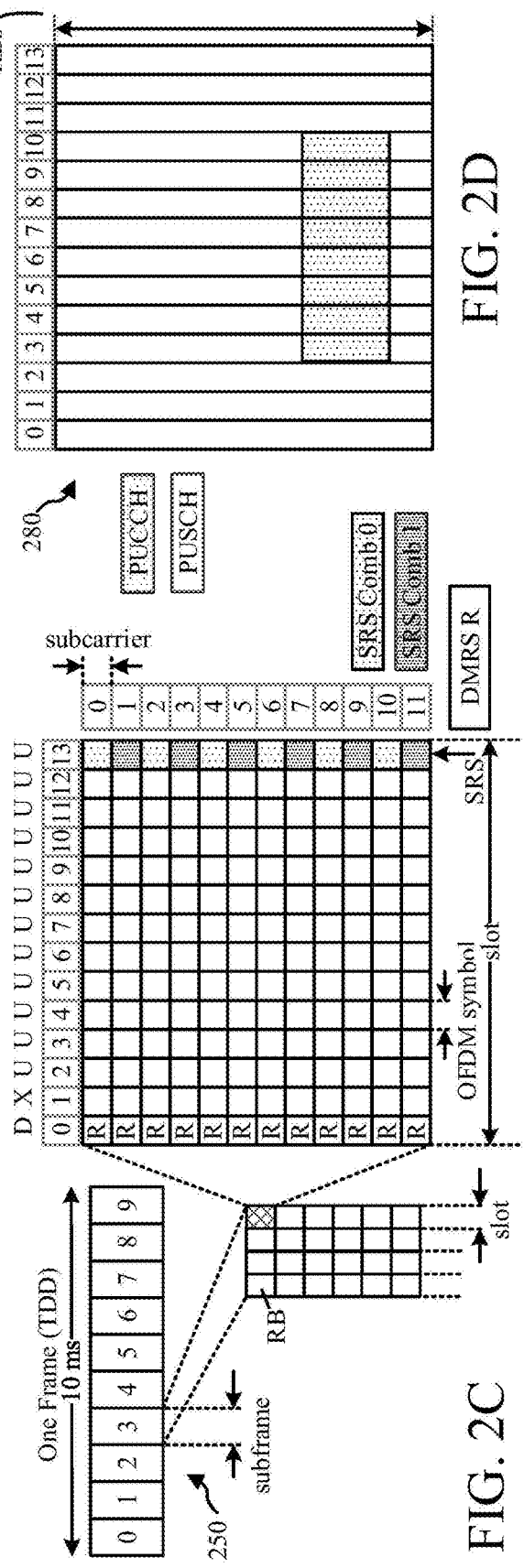
FIG. 2A
FIG. 2B
FIG. 2C
FIG. 2D

BUILDING TRANSPORT BLOCKS IN WIRELESS NETWORKS

This application claims the benefit of U.S. Provisional Application No. 62/986,359, entitled "BUILDING TRANSPORT BLOCKS IN WIRELESS NETWORKS," filed Mar. 6, 2020, which is expressly incorporated by reference herein in its entirety.

BACKGROUND

Technical Field

The present disclosure relates generally to communication systems, and more particularly in some examples, to building transport blocks of data packets at a user equipment (UE) operating in a wireless network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The technology disclosed herein includes method of wireless communication that includes receiving, by a user equipment (UE), an uplink grant for each of a plurality of Physical Uplink Shared CHannel (PUSCH) component carriers. The UE orders each PUSCH component carrier for transmission based at least in part on the uplink grant. The UE ranks logical channels for uplink transmission, and then builds transport blocks comprising data of higher ranked logical channels on higher ordered component carriers.

The technology disclosed herein also includes a certain apparatus for wireless communication that includes means for receiving an uplink grant of the apparatus for each of a plurality of PUSCH component carriers. The certain apparatus also includes means for ordering each PUSCH component carrier for transmission by the apparatus based at least in part on the uplink grant. The certain apparatus further includes means for ranking logical channels for uplink transmission by the apparatus, and means for building transport blocks comprising data of higher ranked logical channels on higher ordered component carriers.

The technology disclosed herein also includes another apparatus for wireless communication that includes a memory and at least one processor coupled to the memory. The processor is configured to receive an uplink grant for each of a plurality of Physical Uplink Shared CHannel (PUSCH) component carriers of the apparatus; order each PUSCH component carrier for transmission based at least in part on the uplink grant; rank logical channels for uplink transmission by the apparatus; and build transport blocks comprising data of higher ranked logical channels on higher ordered component carriers.

The technology disclosed herein also includes a computer-readable medium storing computer executable code. The code, when executed by a processor, causes the processor to receive, by a user equipment (UE), an uplink grant for each of a plurality of Physical Uplink Shared CHannel (PUSCH) component carriers. The code, when executed by a processor, further causes the processor to order, by the UE, each PUSCH component carrier for transmission based at least in part on the uplink grant. The code, when executed by a processor, causes the processor to rank, by the UE, logical channels for uplink transmission, and build, by the UE, transport blocks comprising data of higher ranked logical channels on higher ordered component carriers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
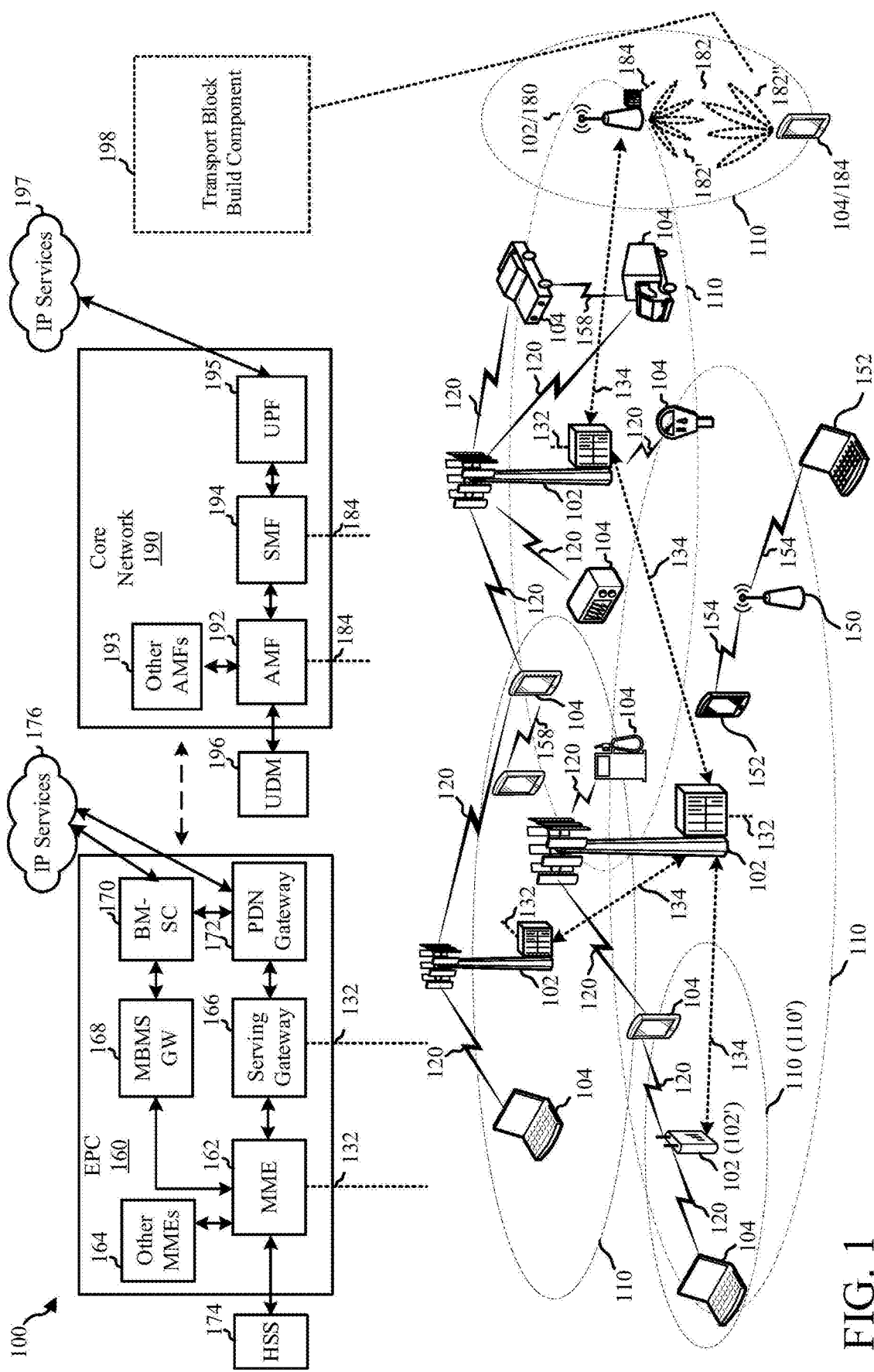
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

A typical UE of a typical wireless network can be characterized by a hierarchical suite of protocols that when implemented are referred to as a "protocol stack." A typical UE protocol stack is discussed in conjunction with FIG. 3 below and includes, in order from closest to the air interface, a physical (PHY) layer, a medium access control (MAC) layer, a Radio Link Control (RLC) layer, a Radio Resource Control (RRC) layer, a Packet Data Convergence Protocol (PDCP) layer, and a Service Data Protocol Adaption (SDAP) layer.

With regard to building transport blocks, the UE's PHY layer receives uplink grants from a base station in Downlink Control Information (DCI). For a UE implementing carrier aggregation (described below) on a Physical Uplink Shared Channel (PUSCH), each component carrier of the aggregation may receive a separate uplink grant. The PHY layer informs the MAC layer to build transport blocks of data packets for each of the component carriers. The MAC layer builds the transport blocks as detailed in MAC specifications for the type of wireless network.

Each UE is configured with a maximum output power $P_{cmax}$. When a UE is operating in carrier aggregation mode on the uplink with a base station, and the total UE transmit power for the uplink grants exceeds $P_{cmax}$, the PHY layer prioritizes the power allocated to each component carrier of the PUSCH.

For example, in a 5G/NR network the PHY layer allocates power in accordance with 3GPP TS 38.213 "Physical layer procedures for control." In descending order of PUSCH power priority rules, the UE should allocate power to PUSCH transmissions containing Hybrid Automatic Repeat Request (HARQ) acknowledgment (ACK) (described below) information, PUSCH transmissions containing Channel Status Information (CSI) (described below), and then PUSCH containing other types of information. In the equal priority cases across different component carriers, the UE prioritizes power allocation for transmissions on the primary cell of a Master Cell Group (MCG) or a Secondary Cell Group (SCG) over transmissions on a secondary cell.

As another example, in an LTE network, the PHY layer allocates power in accordance with 3GPP TS 36.213 "Evolved Universal Terrestrial Radio Access (E-UTRA); Physical layer procedures." TS 36.213 specifies PUSCH transmit power allocation rules similar to those in TS 38.213. For example, if a UE has PUSCH transmission with Uplink Control Information (UCI) on a component carrier, and PUSCH without UCI in any of the other component carriers, and the total transmit power for the uplink grant would exceed $P_{cmax}$, then the UE prioritizes the PUSCH with UCI by allocating power as initially computed and scales the remaining power among PUSCH transmissions without UCI.

These approaches, while generally effective, can still be less effective than desired under certain circumstances. For example, in edge cell scenarios, where UE power is limited, the UE may estimate high path loss. Consequently, under carrier aggregation, the computed PUSCH transmit power of each component carrier could be close to $P_{cmax}$. Due to the transmit power control prioritization rules, some of the component carriers carrying PUSCH might be allocated little or no power, thereby causing cyclic redundancy check (CRC) failures at the network side.

In aspects of the present disclosure, methods, non-transitory computer readable media, and apparatuses are provided. In some examples of the technology disclosed herein, a UE employing carrier aggregation receives an uplink grant from a base station for each of a plurality of PUSCH component carriers. The UE orders each PUSCH component carrier for transmission based at least in part on the uplink grant. The UE ranks logical channels for uplink transmission; and then builds transport blocks comprising data of higher ranked logical channels on higher ordered component carriers. The UE can then transmit the transport blocks across the component carriers.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 184 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHZ and 30 GHz, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104/184 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180/UE 104/184. The transmit and receive directions for the base station 180 may or may not be the same. The transmit and receive directions for the UE 104/184 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to build transport blocks using a transport block build component 198. In such a configuration, a UE 104 employing carrier aggregation receives an uplink grant from a base station 102 for each of a plurality of PUSCH component carriers using transport block build component 198. The UE 104 transport block build component 198 orders each PUSCH component carrier for transmission based at least in part on the uplink grant. The UE 104 transport block component ranks logical channels for uplink transmission; and then builds transport blocks comprising data of higher ranked logical channels on higher ordered component carriers. The UE 104 transport block build component 198 can then transmit the transport blocks across the component carriers.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
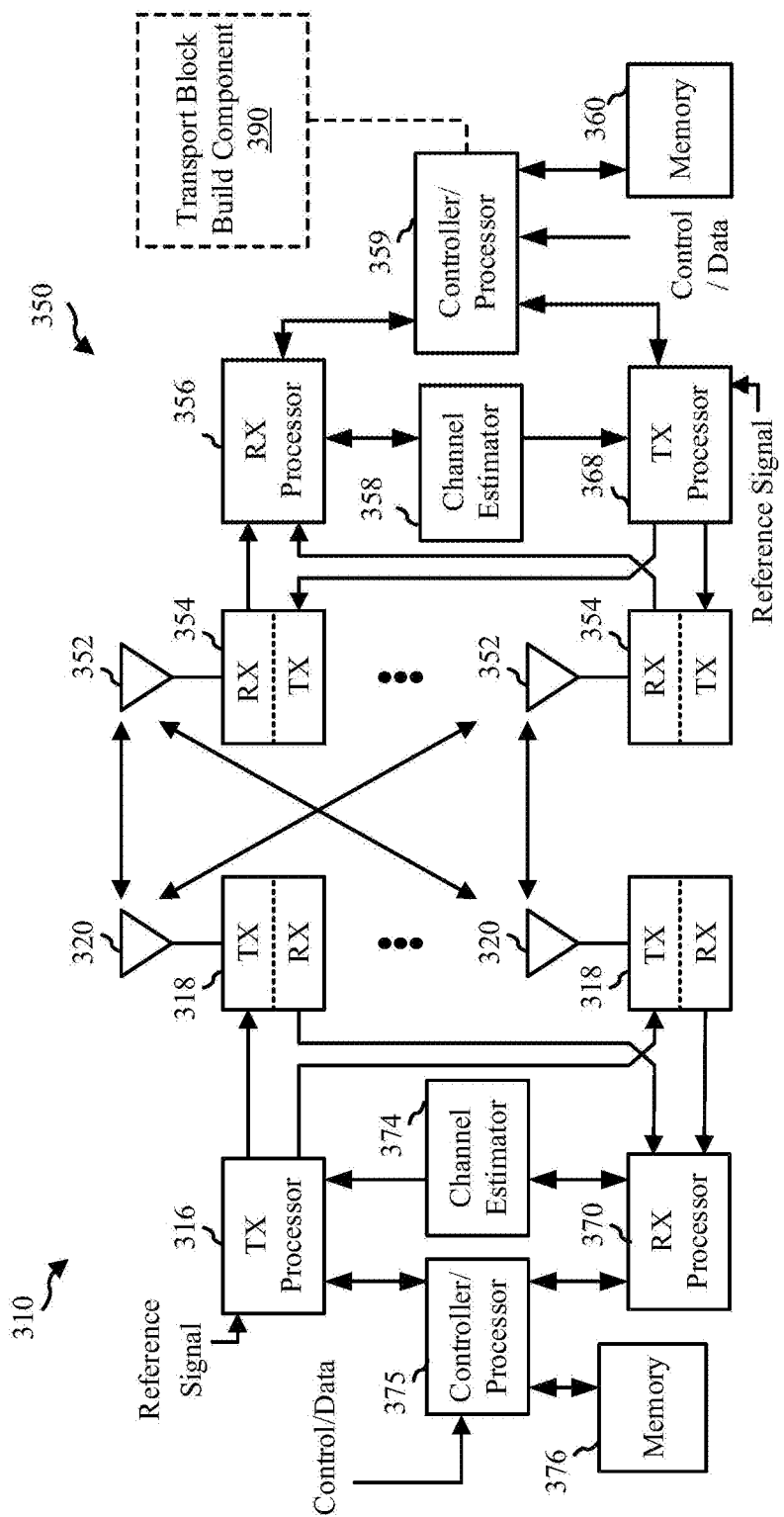
FIG. 3 is a diagram illustrating a base station and user equipment (UE) in an access network, in accordance with example of the technology disclosed herein.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements layer 3 and layer 2 functionality.

In some aspects of the present technology, the UE 104 is configured to build transport blocks. In some such configurations, a UE 104 employing carrier aggregation receives uplink grants from a base station 102, for example, via a receiver 354RX. Each uplink grant is for each of a plurality of PUSCH component carriers. The UE 104, for example using TX processor 368, orders each PUSCH component carrier for transmission based at least in part on the corresponding uplink grant. The UE 104, for example using control processor 359 ranks logical channels for uplink transmission; and then builds, for example using TX processor 368, transport blocks comprising data of higher ranked logical channels on higher ordered component carriers. The UE 104, using transmitter a 354TX, can then transmit the transport blocks across the component carriers. In some examples, UE 350 includes a transport block build component (discussed in more detail below) to perform the transport block build functions described in this paragraph.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
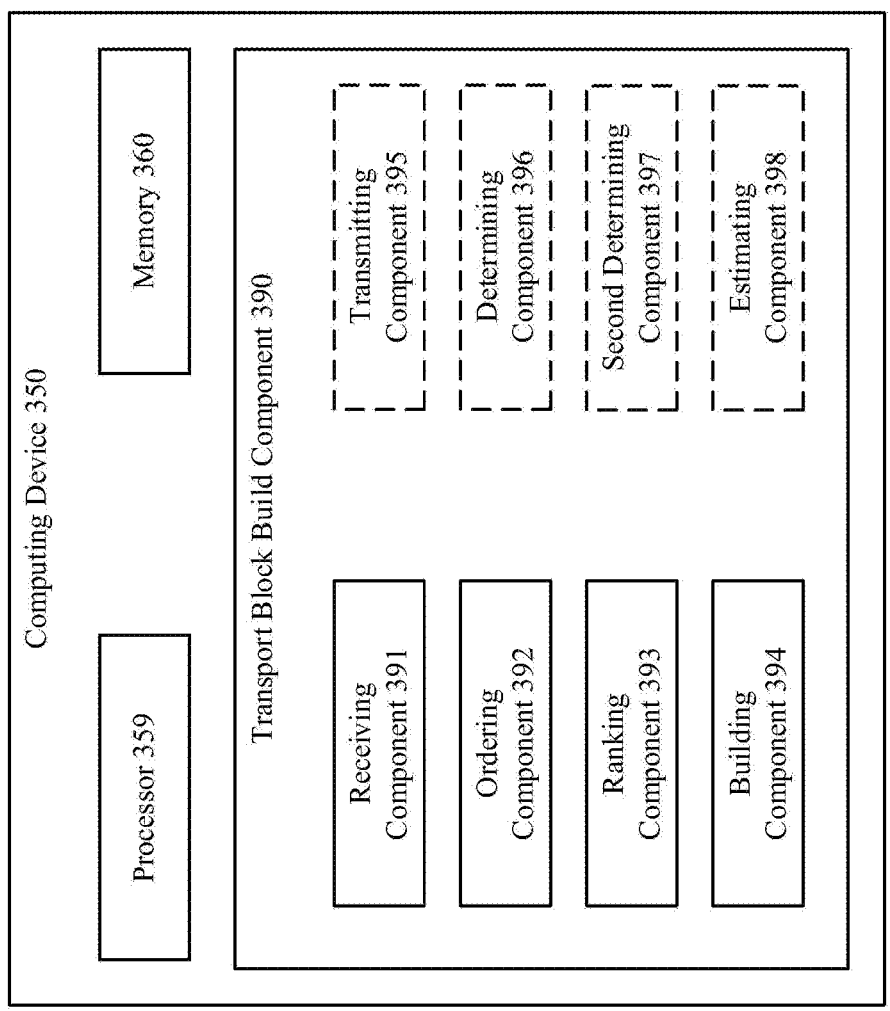
FIG. 4 is a diagram illustrating components for wireless communication, in accordance with example of the technology disclosed herein.

Aspects of the technology disclosed herein can be viewed as components providing means for performing the function of each particular component. For example, referring to FIG. 4, and continuing to refer to prior figures for context, the UE 350 may include a Transport Block Build Component 390. The Transport Block Build Component 390 may include a receiving component 391, an ordering component 392, a ranking component 393 a building component 394. In some examples, the Transport Block Build Component 390 includes a transmitting component 395 and a determining component 396, a second determining component 397, and an estimating component 398.

In some examples, the receiving component 391 may be configured to, or may comprise means for, receiving an uplink grant for each of a plurality of PUSCH component carriers. The ordering component 392 may be configured to, or may comprise means for, ordering each PUSCH component carrier for transmission based at least in part on the uplink grant. The ranking component 393 may be configured to, or may comprise means for, ranking logical channels for uplink transmission. The building component 394 may be configured to, or may comprise means for, building transport blocks comprising data of higher priority logical channels on higher priority component carriers. The transmitting component 395 may be configured to, or may comprise means for, transmitting the transport blocks across the component carriers. The determining component 396 may be configured to, or may comprise means for, determining, prior to ordering each PUSCH component carrier, that a total transmit power for the UE under the uplink grant exceeds a maximum output power $P_{cmax}$ of the UE. The second determining component 397 may be configured to, or may comprise means for, determining, prior to the ordering, that a total transmit power for the UE under the uplink grant is less than or equal to a maximum output power $P_{cmax}$ of the UE. The estimating component 398 may be configured to, or may comprise means for, estimating, in response to the determining, a likelihood that each PUSCH component carrier will successfully transmit transport blocks with the least number of retransmissions. While FIG. 1 and FIG. 3 illustrate the Transport Block Build Component 390 as part of the UE 184 overall or as part of the controller/processor 359 of UE 350, the means for performing the functions described above may be allocated to various components.

Consider, as a continuing example, base station 180 and UE 184 of FIG. 1 operating in access network 100. UE 184 is operating in carrier aggregation mode in the uplink to base station 180. In the continuing example, operations of methods of the technology disclosed herein are illustrated as performed by processes in the PHY layer and the MAC layer of the UE 184 as an example only.

Figure 5:
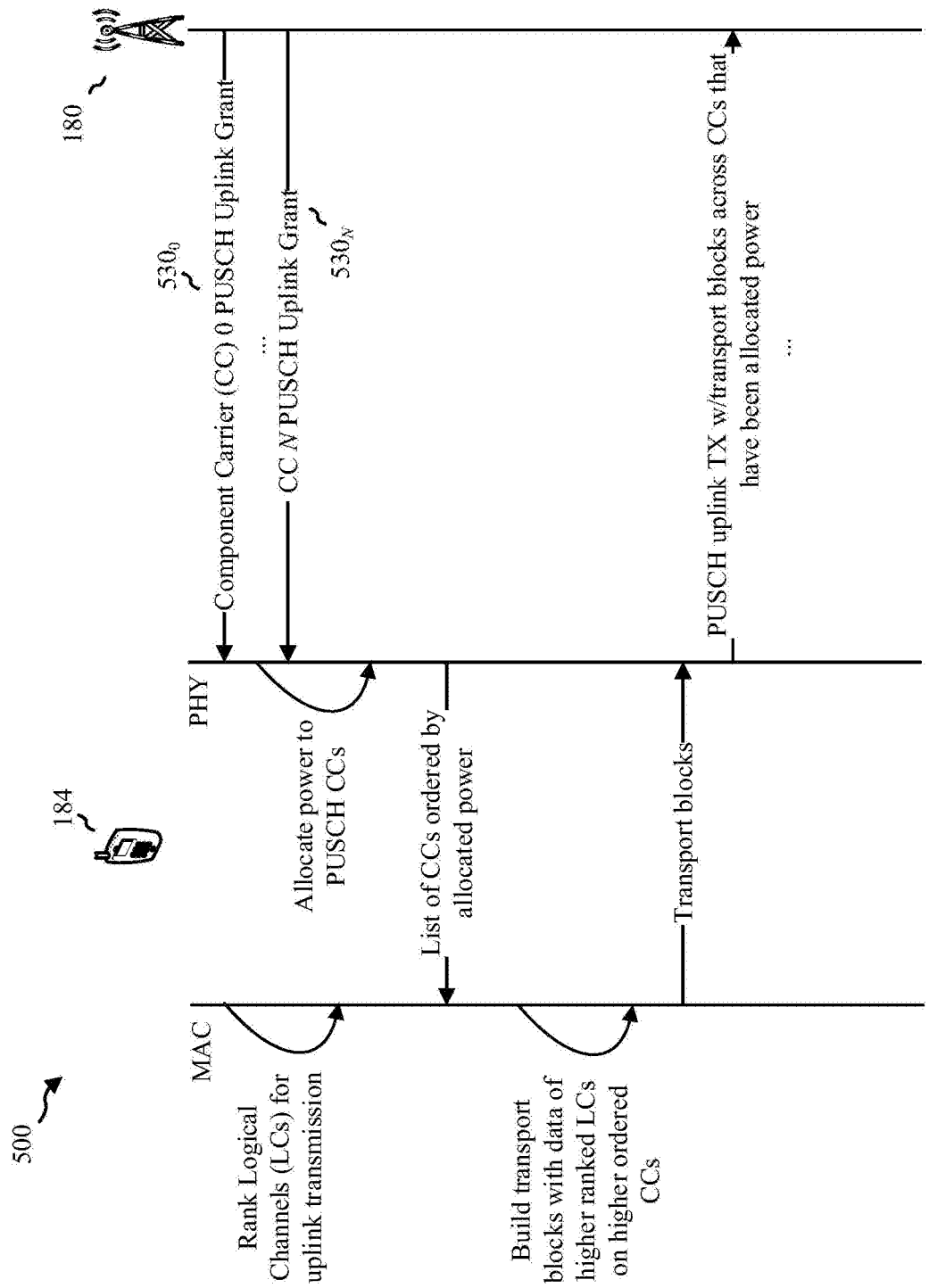
FIG. 5 is a message flow diagram of methods of wireless communication in accordance with example of the technology disclosed herein.

Referring to FIG. 5, and continuing to refer to prior figures for context, a message flow diagram 500 of the continuing example is shown to be used in conjunction with the descriptions of subsequent figures, in accordance with examples of the technology disclosed herein.

Figure 6:
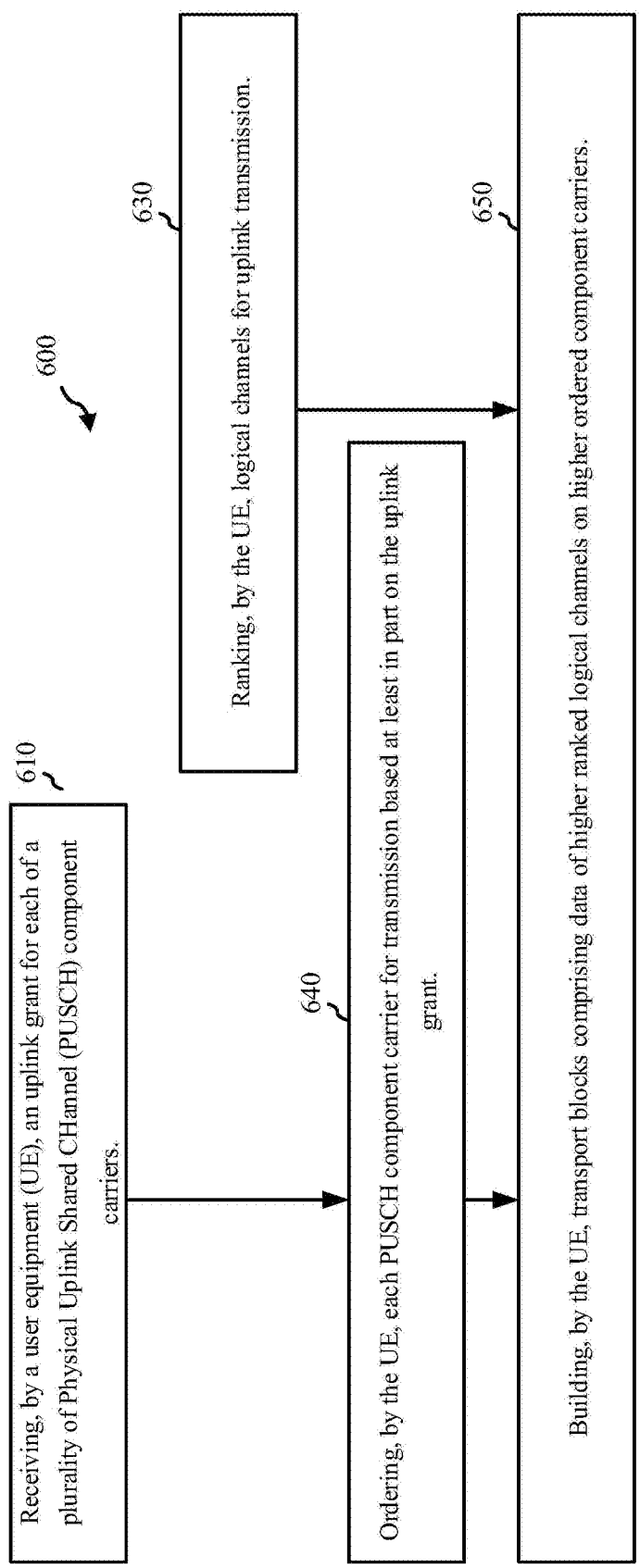
FIG. 6 is a flowchart of methods of wireless communication in accordance with example of the technology disclosed herein.

Referring to FIG. 6, and continuing to refer to prior figures for context, a flowchart of methods 600 of wireless communication is shown, in accordance with examples of the technology disclosed herein. In such methods 600, a UE receives an uplink grant for each of a plurality of PUSCH component carriers—Block 610. In the continuing example, the UE 184 PHY layer 520 receives uplink grants $530_0$-$530_N$ from base station 180 as part of DCI for each component carrier-specifically for component carriers CC0 and CC1 in a given slot. The PHY layer 520 configures time domain allocations such that PUSCH data for CC0 is from symbol 0 to symbol 12; and PUSCH data on CC1 is from symbol 0 to symbol 13. Further, the PHY layer 520 determines to include a PUCCH HARQ ACK/NACK in the same time slot on symbol 13. Due to UCI multiplexing rules, the HARQ ACK/NACK bit would be piggybacked onto the PUSCH of CC1.

In some examples, the receiving component 391 receives, from the base station 180, an uplink grant for each of a plurality of PUSCH component carriers. Accordingly, the receiving component 391 may provide means for receiving, from the base station 180, an uplink grant for each of a plurality of PUSCH component carriers.

The UE orders each PUSCH component carrier for transmission based at least in part on the uplink grant—Block 640. In the continuing example, the uplink grant was such that a HARQ ACK/NACK will be transmitted on a PUCCH resource in the same slot as PUSCH data. In these circumstances, total UE uplink transmit power would exceed $P_{cmax}$, resulting in a greater power allocation to PUSCH CC1 to increase the likelihood that the HARQ ACK/NACK bit piggybacked onto the PUSCH of CC1 is reliably received at the base station 180. In particular, the PHY layer determined that CC1 will be carrying data normally transmitted on a control channel (the HARQ ACK/NACK), and allocated more power to CC1—making the ordered list {CC1, CC0}.

In some examples, the ordering component 392 orders each PUSCH component carrier for transmission based at least in part on the uplink grant. Accordingly, the ordering component 392 may provide means for ordering each PUSCH component carrier for transmission based at least in part on the uplink grant.

The UE ranks logical channels for uplink transmission—Block 630. Logical channels define the type of information to be transferred, and can be categorized as control channels and traffic channels. Control channels carry signaling messages in the control plane. Traffic channels generally carry data in the user plane. With regard to the uplink, there are two control logical channels: the Common Control Channel (CCCH) as common to multiple UEs, and the Dedicated Control CHannel (DCCH) used to transmit dedicated control information for a particular UE. In addition, the uplink includes one traffic channel: the Dedicated Traffic CHannel (DTCH) for that UE. DTCH can carry both voice traffic and data traffic.

In the continuing example, there is a small amount of CCCH data to be transmitted during the slot, a small amount of DCCH data, some user voice data on DTCH and a large amount of user video upload data (enough to occupy all the transport blocks allocated for either one of CC1 and CC0 during the slot). The MAC layer 510 ranks logical channels for uplink transmission 512 as (in order of decreasing rank) CCCH, DCCH, DTCH voice, and DTCH data.

In some examples, the ranking component 393 ranks logical channels for uplink transmission. Accordingly, the ranking component 393 may provide means for ranking logical channels for uplink transmission.

The UE builds transport blocks comprising data of higher ranked logical channels on higher ordered component carriers—Block 650. In the continuing example, the MAC layer 510 builds transport blocks such that CCCH data, DCCH data, all the DTCH voice data, and some of the DTCH video data are carried on CC1; while the remainder of DTCH video data is carried on the lower-powered CC0.

In some examples, the building component 394 ranks logical channels for uplink transmission. Accordingly, the building component 394 may provide means for building transport blocks comprising data of higher ranked logical channels on higher ordered component carriers.

Figure 7:
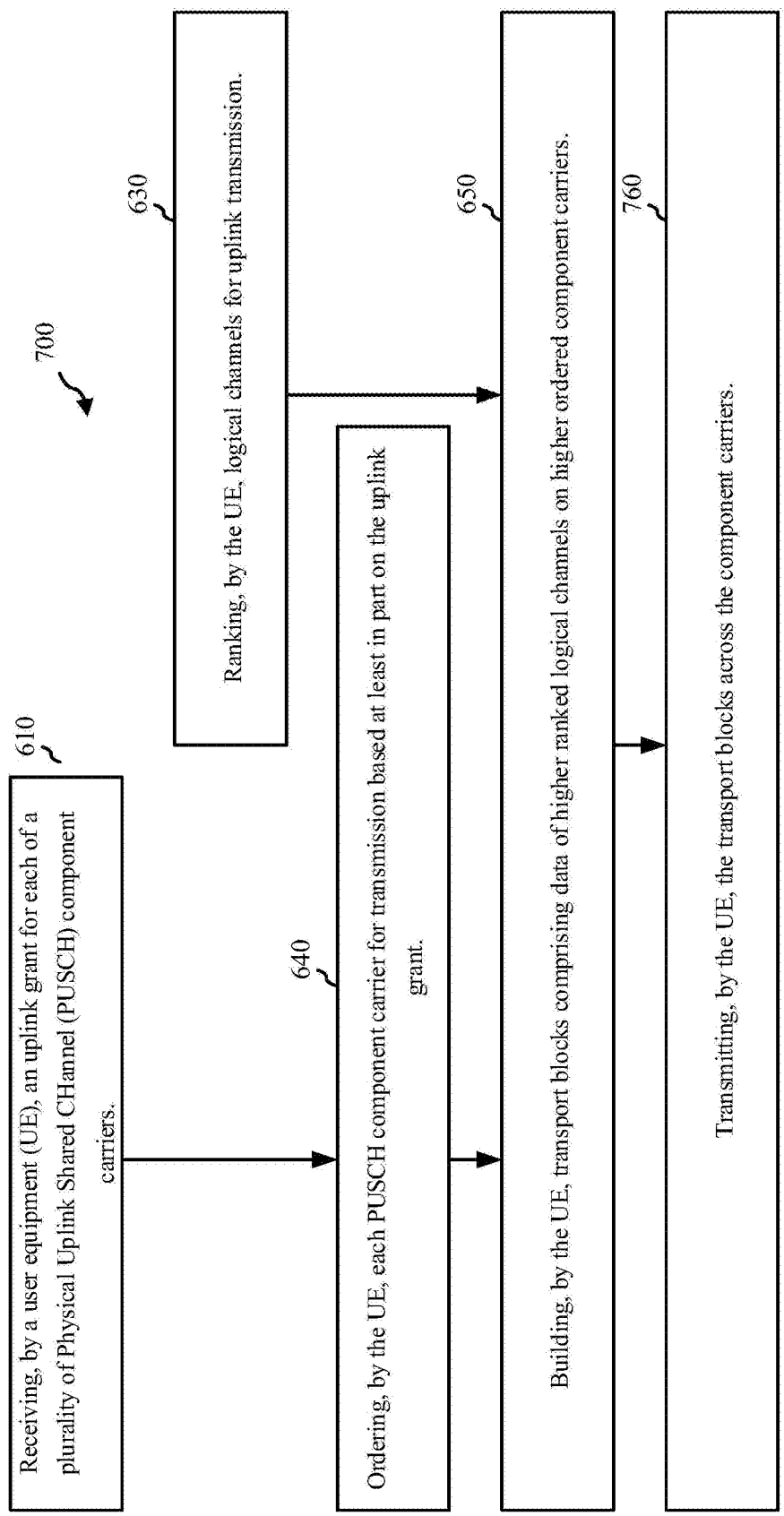
FIG. 7 is a flowchart of methods of wireless communication in accordance with example of the technology disclosed herein.

Referring to FIG. 7, and continuing to refer to prior figures for context, a flowchart of methods 700 of wireless communication is shown, in accordance with examples of the technology disclosed herein. In such methods 700, Block 610, Block, 630, Block 640, and Block 650 are performed as described in connection with FIG. 6.

The UE transmits the transport blocks across the component carriers—Block 760. In the continuing example, the UE 184 PHY layer 520 transmits CCCH data, DCCH data, all the DTCH voice data, and some of the DTCH video data on CC1; while the remainder of DTCH video data is transmitted on the lower-powered CC0. In some examples, the transmitting component 395 transmits the transport blocks across the component carriers. Accordingly, the building component 394 may provide means for transmitting the transport blocks across the component carriers.

Figure 8:
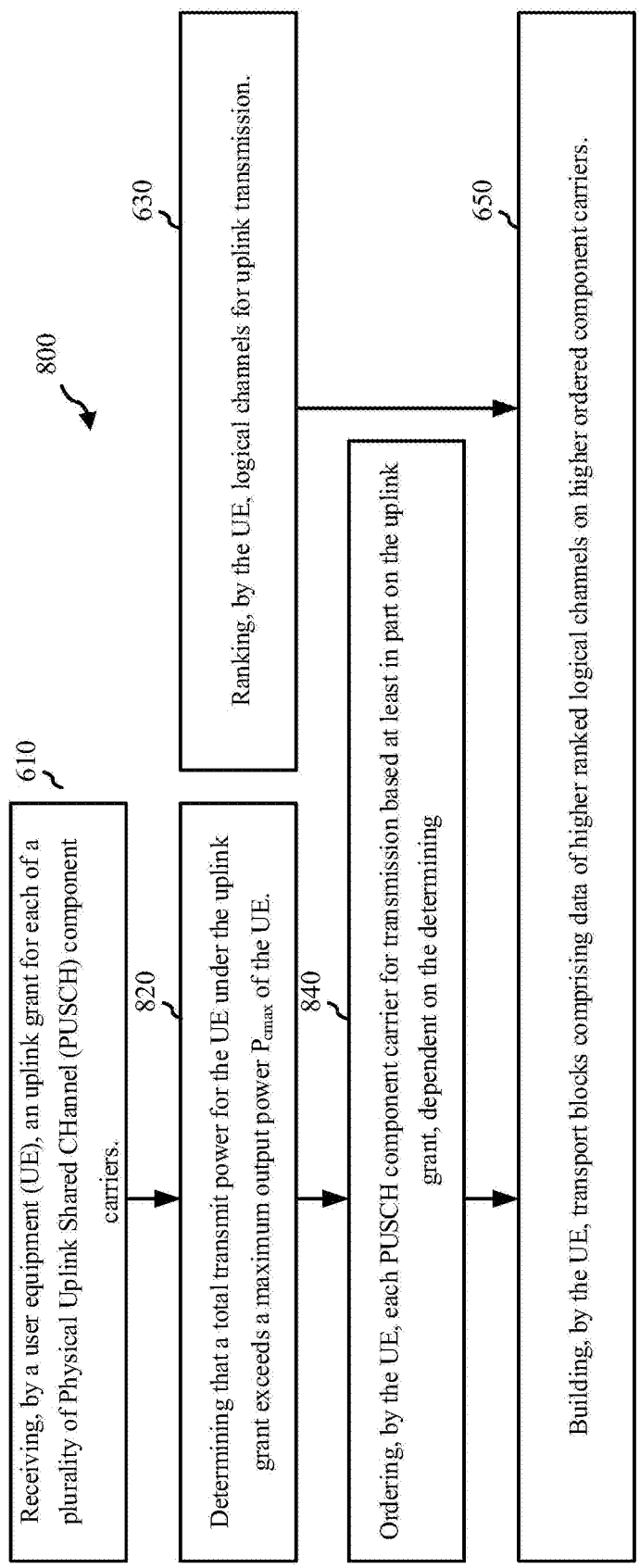
FIG. 8 is a flowchart of methods of wireless communication in accordance with example of the technology disclosed herein.

Referring to FIG. 8, and continuing to refer to prior figures for context, a flowchart of methods 800 of wireless communication is shown, in accordance with examples of the technology disclosed herein. In such methods 800, Block 610, Block, 630, and Block 650 are performed as described in connection with FIG. 6.

The UE determines, prior to ordering each PUSCH component carrier, that a total transmit power for the UE under the uplink grant exceeds a maximum output power $P_{cmax}$ of the UE—Block 820. Further, ordering each PUSCH component carrier (as described in connection with Block 640) is dependent on determining that the total transmit power for the UE under the uplink grant exceeding the $P_{cmax}$—Block 840.

As described in connection with block 640, the uplink grant was such that a HARQ ACK/NACK is to be transmitted on a PUCCH resource in the same slot as PUSCH data. In these circumstances, total UE uplink transmit power was determined to exceed $P_{cmax}$, resulting in the ordered list {CC1, CC0}.

In some examples, the determining component 396 determines, prior to ordering each PUSCH component carrier, that a total transmit power for the UE under the uplink grant exceeds a maximum output power $P_{cmax}$ of the UE. Accordingly, the determining component 396 may provide means for determining, prior to ordering each PUSCH component carrier, that a total transmit power for the UE under the uplink grant exceeds a maximum output power $P_{cmax}$ of the UE.

Figure 9:
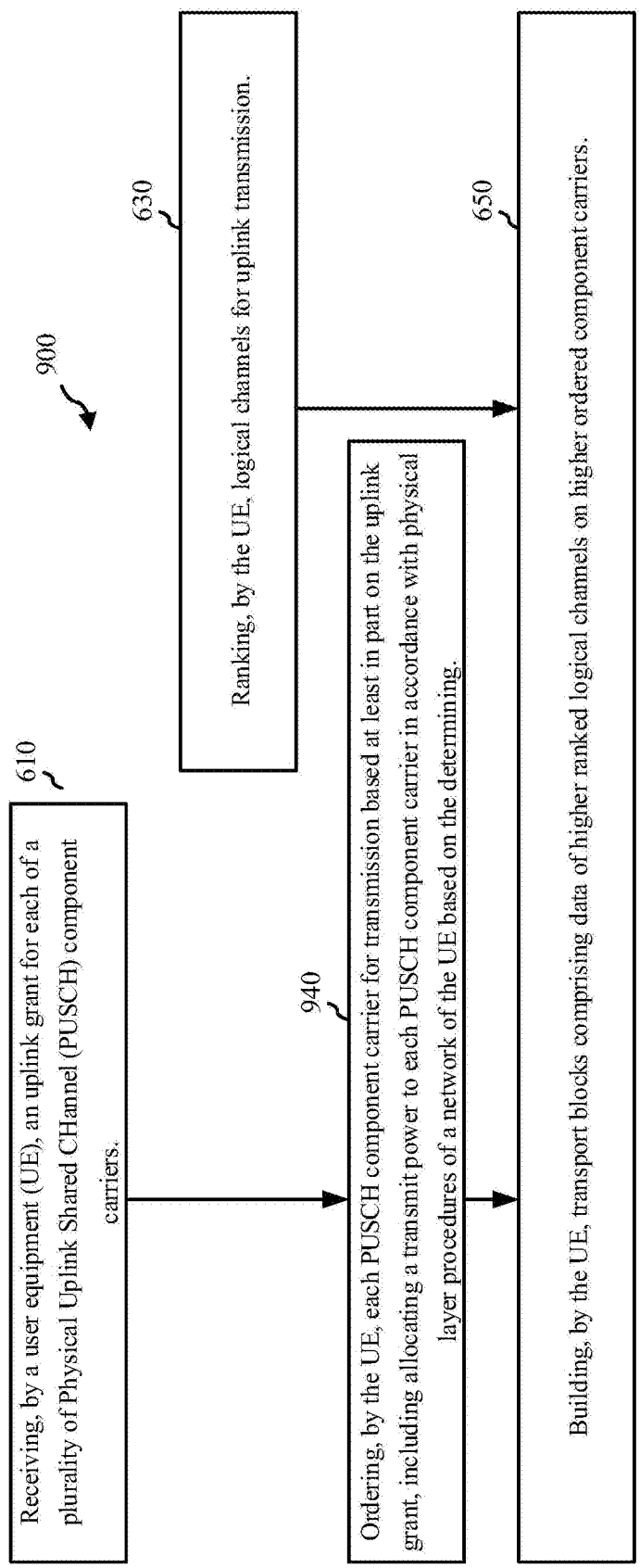
FIG. 9 is a flowchart of methods of wireless communication in accordance with example of the technology disclosed herein.

Referring to FIG. 9, and continuing to refer to prior figures for context, a flowchart of methods 900 of wireless communication is shown, in accordance with examples of the technology disclosed herein. In such methods 900, Block 610, Block, 630, and Block 650 are performed as described in connection with FIG. 6.

The UE allocates transmit power to each PUSCH component carrier in accordance with physical layer procedures of a network of the UE based on the determining—Block 940. In such cases, a particular component carrier allocated higher power corresponds to a higher ordered component carrier. This is the case as described in the continuing example in connection with Block 640.

Figure 10:
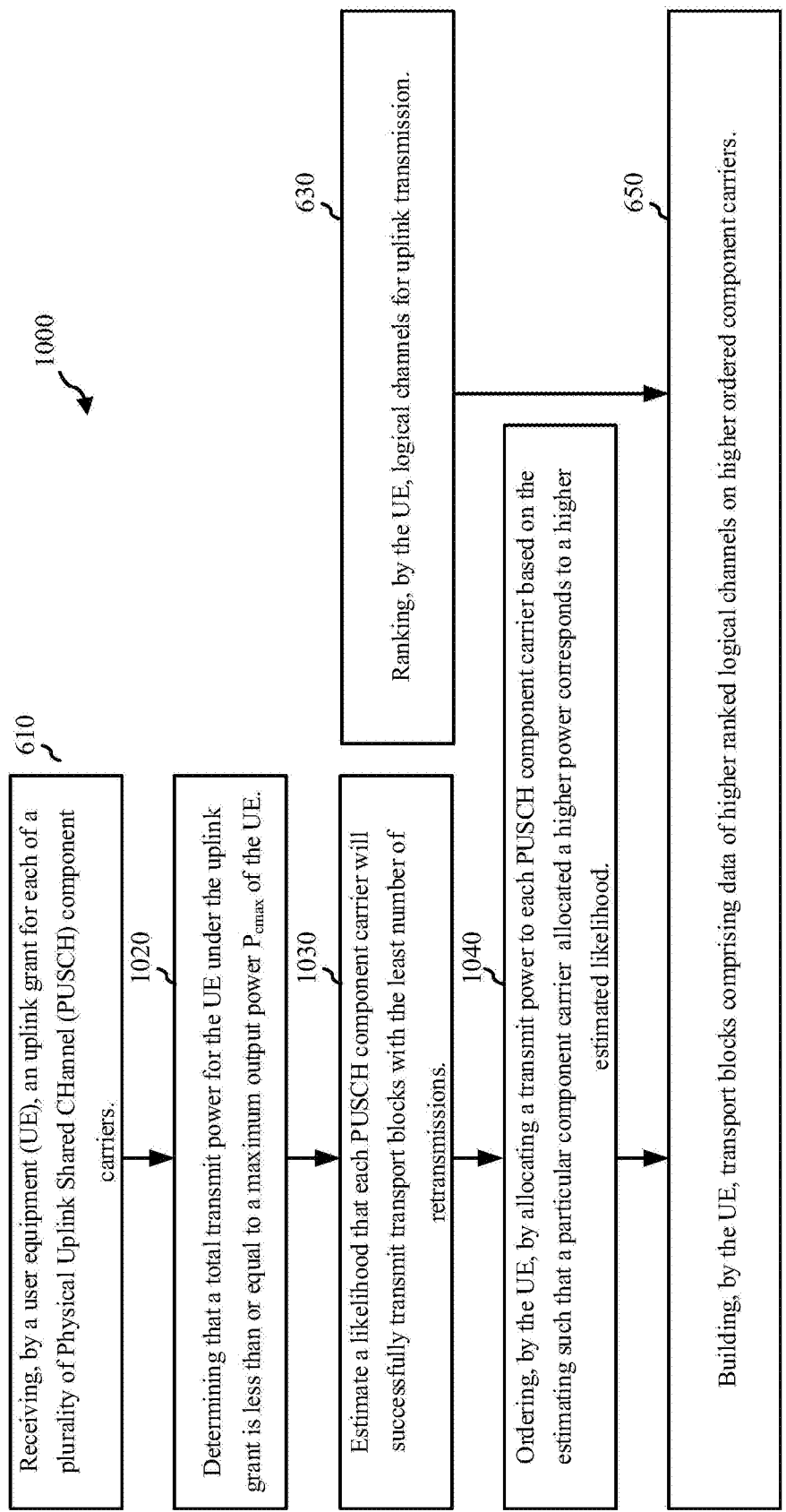
FIG. 10 is a flowchart of methods of wireless communication in accordance with example of the technology disclosed herein.

Referring to FIG. 10, and continuing to refer to prior figures for context, a flowchart of methods 1000 of wireless communication is shown, in accordance with examples of the technology disclosed herein. In such methods 1000, Block 610, Block, 630, and Block 650 are performed as described in connection with FIG. 6.

In such methods the UE determines, prior to the ordering, that a total transmit power for the UE under the uplink grant is less than or equal to a maximum output power $P_{cmax}$ of the UE—Block 1020.

In some examples, the second determining component 397 determines, prior to the ordering, that a total transmit power for the UE under the uplink grant is less than or equal to a maximum output power $P_{cmax}$ of the UE. Accordingly, the determining component 396 may provide means for determining, prior to the ordering, that a total transmit power for the UE under the uplink grant is less than or equal to a maximum output power $P_{cmax}$ of the UE.

The UE then estimates, in response to the determining, a likelihood that each PUSCH component carrier will successfully transmit transport blocks with the least number of retransmissions—Block 1030. As described in connection with block 640, the uplink grant was such that a HARQ ACK/NACK is to be transmitted on a PUCCH resource in the same slot as PUSCH data. In these circumstances, total UE uplink transmit power was determined to be less than $P_{cmax}$. In some examples, a history of physical layer metrics for the UE, e.g., block error ratio (BLER), code rate, modulation and coding scheme (MCS), served as the basis for estimating the likelihood. In some examples, a machine learning algorithm for estimating likelihood of successful transmission was trained on the history of physical layer metrics. In the continuing example, CC0 was determined to more likely communicate transport blocks to the resulting in the ordered list {CC0, CC1}.

In some examples, the estimating component 398 determines, in response to the determining, a likelihood that each PUSCH component carrier will successfully transmit transport blocks with the least number of retransmissions. Accordingly, the determining component 396 may provide means for estimating, in response to the determining, a likelihood that each PUSCH component carrier will successfully transmit transport blocks with the least number of retransmissions.

In such methods, the UE orders by allocating a transmit power to each PUSCH component carrier based on the estimating such that a particular component carrier allocated a higher power corresponds to a higher estimated likelihood—Block 1040. In the continuing example, the UE allocates a higher transmit power to CC0 compared to CC1.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and aspects thereof may be combined with aspects of other embodiments or teaching described herein, without limitation.

Example 1 is a method, apparatus, "means for" apparatus, or computer readable medium of wireless communication at a first user equipment (UE), comprising: receiving, by a user equipment (UE), an uplink grant for each of a plurality of Physical Uplink Shared CHannel (PUSCH) component carriers; ordering, by the UE, each PUSCH component carrier for transmission based at least in part on the uplink grant; ranking, by the UE, logical channels for uplink transmission; and building, by the UE, transport blocks comprising data of higher ranked logical channels on higher ordered component carriers.

In Example 2, Example 1 further includes transmitting, by the UE, the transport blocks across the component carriers.

In Example 3, Example 1 or Example 2 further includes determining, prior to ordering each PUSCH component carrier, that a total transmit power for the UE under the uplink grant exceeds a maximum output power $P_{cmax}$ of the UE; and wherein ordering each PUSCH component carrier is dependent on determining that the total transmit power for the UE under the uplink grant exceeding the $P_{cmax}$.

In Example 4, any of Examples 1-3 further includes allocating a transmit power to each PUSCH component carrier in accordance with physical layer procedures of a network of the UE based on the determining; and wherein a particular component carrier allocated higher power corresponds to a higher ordered component carrier.

In Example 5, any of Examples 1-4 further includes wherein receiving the uplink grant and ordering each PUSCH component carrier are performed by a physical (PHY) layer process of the UE.

In Example 6, any of Examples 1-5 further includes wherein ranking logical channels and building transport blocks are performed by a medium access control (MAC) layer process of the UE.

In Example 7, Example 1 further includes determining, by the UE, that a total transmit power for the UE under the uplink grant is less than or equal to a maximum output power $P_{cmax}$ of the UE. In such examples, the UE estimates, in response to the determining, a likelihood that each PUSCH component carrier will successfully transmit transport blocks with the least number of retransmissions. In such examples, ordering includes allocating a transmit power to each PUSCH component carrier based on the estimating such that a particular component carrier allocated a higher power corresponds to a higher estimated likelihood.

In Example 8, any of Example 1 and Example 7 bases performs the estimating based on a history of physical layer metrics for the UE.

In Example 9, any of Example 1, Example 7, and Example 8 performs the estimating using machine learning based on the history of physical layer metrics for the UE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A method of wireless communication in a user equipment (UE) of a wireless network, comprising:
    receiving an uplink grant for each of a plurality of Physical Uplink Shared CHannel (PUSCH) component carriers;
    determining whether a total transmit power for the UE under the uplink grant exceeds a maximum output power $P_{cmax}$ of the UE;
    ordering each PUSCH component carrier for transmission based at least in part on the uplink grant;
    ranking logical channels for uplink transmission;
    estimating, in response to determining that the total transmit power for the UE under the uplink grant is less than or equal to a maximum output power $P_{cmax}$ of the UE, a likelihood that each PUSCH component carrier will successfully transmit transport blocks with least number of retransmissions;
    and
    building transport blocks comprising data of higher ranked logical channels on higher ordered component carriers,
    wherein the ordering comprises allocating a transmit power to each PUSCH component carrier based on the estimating such that a particular component carrier allocated a higher power corresponds to a higher estimated likelihood.

2. The method of claim 1, further comprising:
    transmitting the transport blocks across the component carriers.

3. The method of claim 1, wherein receiving the uplink grant and ordering each PUSCH component carrier are performed by a physical (PHY) layer process of the UE.

4. The method of claim 3, wherein ranking logical channels and building transport blocks are performed by a medium access control (MAC) layer process of the UE.

5. The method of claim 1, wherein the estimating is based on a history of physical layer metrics for the UE.

6. The method of claim 5, wherein the estimating is based machine learning using the history of physical layer metrics.

7. The method of claim 1, further comprising:
    transmitting, by the UE, the transport blocks across the component carriers.

8. The method of claim 7, further comprising:
    determining, prior to ordering each PUSCH component carrier, that the total transmit power for the UE under the uplink grant exceeds a maximum output power $P_{cmax}$ of the UE,
    wherein ordering each PUSCH component carrier is dependent on determining that the total transmit power for the UE under the uplink grant exceeding the $P_{cmax}$.

9. The method of claim 1, wherein the history of physical layer metrics for the UE includes block error rate ratio (BLER) code rate and modulation and coding scheme (SCS).

10. An apparatus for wireless communication, comprising:
    means for receiving an uplink grant of the apparatus for each of a plurality of Physical Uplink Shared CHannel (PUSCH) component carriers;
    means for determining whether a total transmit power for the apparatus under the uplink grant exceeds a maximum output power $P_{cmax}$ of the apparatus;

means for ordering each PUSCH component carrier for transmission by the apparatus based at least in part on the uplink grant;

means for ranking logical channels for uplink transmission by the apparatus;

means for estimating, in response to determining that the total transmit power for the apparatus under the uplink grant is less than or equal to a maximum output power $P_{cmax}$ of the apparatus, a likelihood that each PUSCH component carrier will successfully transmit transport blocks with least number of retransmissions; and means for building transport blocks comprising data of higher ranked logical channels on higher ordered component carriers, wherein the means for ordering comprises means for allocating a transmit power to each PUSCH component carrier based on the estimating such that a particular component carrier allocated a higher power corresponds to a higher estimated likelihood.

11. The apparatus of claim 10, further comprising:
means for transmitting the transport blocks across the component carriers.

12. The apparatus of claim 11, further comprising:
means for determining, prior to ordering each PUSCH component carrier, that the total transmit power for the apparatus under the uplink grant exceeds a maximum output power $P_{cmax}$ of the apparatus, wherein the means for ordering each PUSCH component carrier is dependent on the total transmit power for the apparatus under the uplink grant exceeding the $P_{cmax}$.

13. The apparatus of claim 12, wherein the means for ordering each PUSCH component carrier comprises:
means for allocating a transmit power to each PUSCH component carrier in accordance with physical layer procedures of a network of the apparatus based on the determining, wherein a particular component carrier allocated higher power corresponds to a higher ordered component carrier.

14. The apparatus of claim 10, wherein the means for receiving the uplink grant and the means for ordering each PUSCH component carrier are included in a means for performing physical (PHY) layer processes of the apparatus.

15. The apparatus of claim 14, wherein the means for ranking logical channels and the means for building transport blocks are included in a means for performing medium access control (MAC) layer processes of the apparatus.

16. An apparatus for wireless communication, comprising:
a memory including instructions; and
at least one processor coupled to the memory and configured to execute the instructions by the at least one processor, individually or in any combination, to cause the apparatus to:
receive an uplink grant for each of a plurality of Physical Uplink Shared CHannel (PUSCH) component carriers of the apparatus;
determine whether a total transmit power for the apparatus under the uplink grant exceeds a maximum output power $P_{cmax}$ of the apparatus;
order each PUSCH component carrier for transmission based at least in part on the uplink grant;
rank logical channels for uplink transmission by the apparatus;
estimate, in response to determining that the total transmit power for the apparatus under the uplink grant is less than or equal to a maximum output power $P_{cmax}$ of the apparatus, a likelihood that each PUSCH component carrier will successfully transmit transport blocks with least number of retransmissions; and
build transport blocks comprising data of higher ranked logical channels on higher ordered component carriers,
wherein the ordering comprises allocating a transmit power to each PUSCH component carrier based on the estimating such that a particular component carrier allocated a higher power corresponds to a higher estimated likelihood.

17. The apparatus of claim 16, wherein the processor is further configured to:
transmit the transport blocks across the component carriers.

18. The apparatus of claim 17, wherein the processor is further configured to:
determine, prior to ordering each PUSCH component carrier, that the total transmit power for the apparatus under the uplink grant exceeds a maximum output power $P_{cmax}$ of the apparatus,
wherein ordering each PUSCH component carrier is dependent on the total transmit power for the apparatus under the uplink grant exceeding the $P_{cmax}$.

19. The apparatus of claim 18, wherein to order each PUSCH component carrier comprises to:
allocate a transmit power to each PUSCH component carrier in accordance with physical layer procedures of a network of the apparatus based on the determining,
wherein a particular component carrier allocated higher power corresponds to a higher ordered component carrier.

20. The apparatus of claim 16, wherein to receive the uplink grant and to order each PUSCH component carrier are performed by a physical (PHY) layer process of the apparatus.

21. The apparatus of claim 20, wherein to rank logical channels and to build transport blocks are performed by a medium access control (MAC) layer process of the apparatus.

22. A computer-readable medium storing computer executable code, the code when executed by one or more processors, individually or in any combination, of a user equipment (UE) cause the UE to:
receive an uplink grant for each of a plurality of Physical Uplink Shared CHannel (PUSCH) component carriers;
determining whether a total transmit power for the UE under the uplink grant exceeds a maximum output power $P_{cmax}$ of the UE;
order each PUSCH component carrier for transmission based at least in part on the uplink grant;
rank logical channels for uplink transmission;
estimate, in response to determining that the total transmit power for the UE under the uplink grant is less than or equal to a maximum output power $P_{cmax}$ of the UE, a likelihood that each PUSCH component carrier will successfully transmit transport blocks with least number of retransmissions, and
build transport blocks comprising data of higher ranked logical channels on higher ordered component carriers,
wherein the ordering comprises allocating a transmit power to each PUSCH component carrier based on the estimating such that a particular component carrier allocated a higher power corresponds to a higher estimated likelihood.

23. The computer-readable medium of claim 22, wherein the code when executed by one or more processors of a user equipment (UE) further cause the UE to:
  transmit the transport blocks across the component carriers.

24. The computer-readable medium of claim 23, wherein the code when executed by one or more processors of a user equipment (UE) further cause the UE to:
  determine, prior to order each PUSCH component carrier, that the total transmit power for the UE under the uplink grant exceeds a maximum output power $P_{cmax}$ of the UE,
  wherein to order each PUSCH component carrier is dependent on the total transmit power for the UE under the uplink grant exceeding the $P_{cmax}$.

25. The computer-readable medium of claim 24, wherein to order each PUSCH component carrier comprises to:
  allocate a transmit power to each PUSCH component carrier in accordance with physical layer procedures of a network of the UE based on the determining,
  wherein a particular component carrier allocated higher power corresponds to a higher ordered component carrier.

26. The computer-readable medium of claim 22, wherein to receive the uplink grant and to order each PUSCH component carrier are performed by a physical (PHY) layer process of the UE.

27. The computer-readable medium of claim 26, wherein to rank logical channels and to build transport blocks are performed by a medium access control (MAC) layer process of the UE.

* * * * *